UNITED STATES PATENT OFFICE.

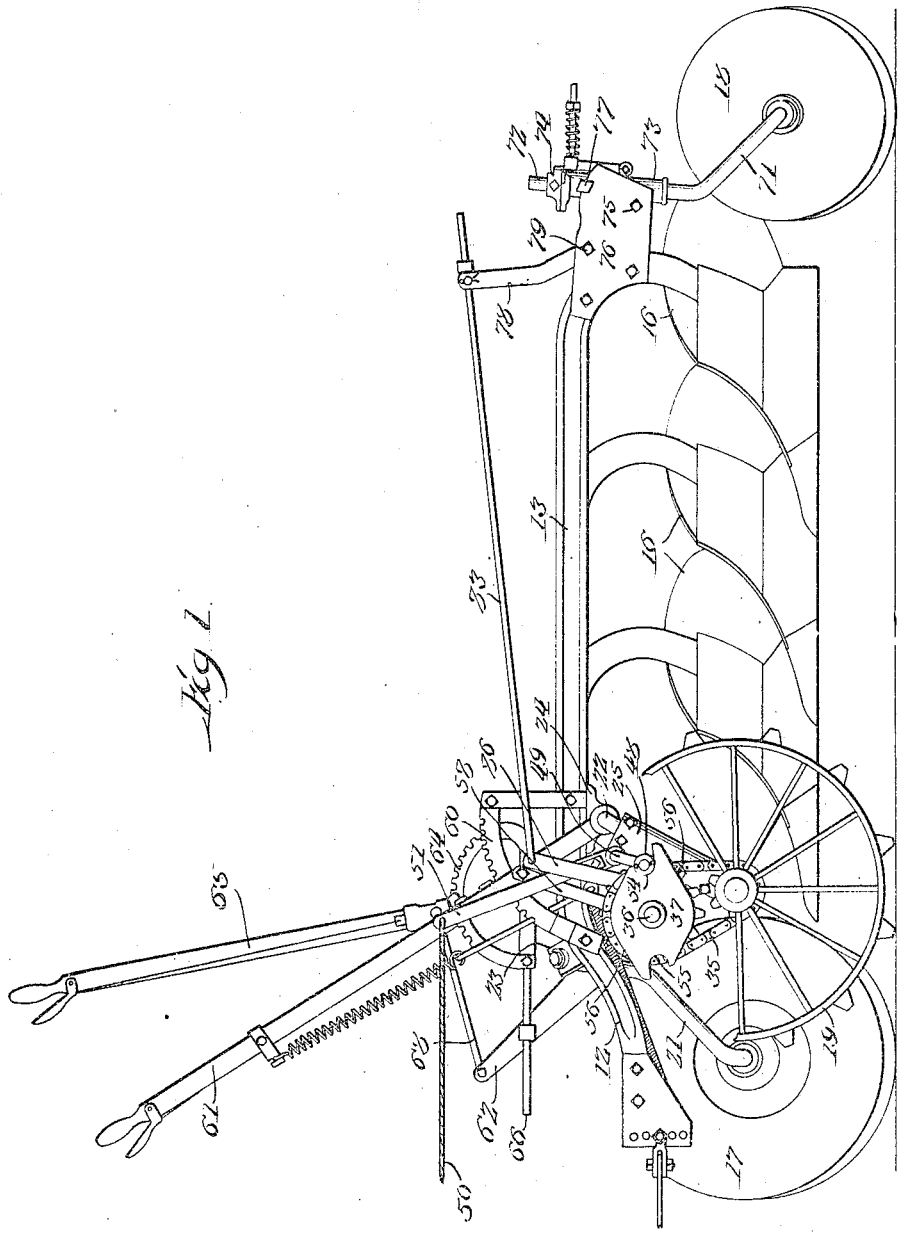

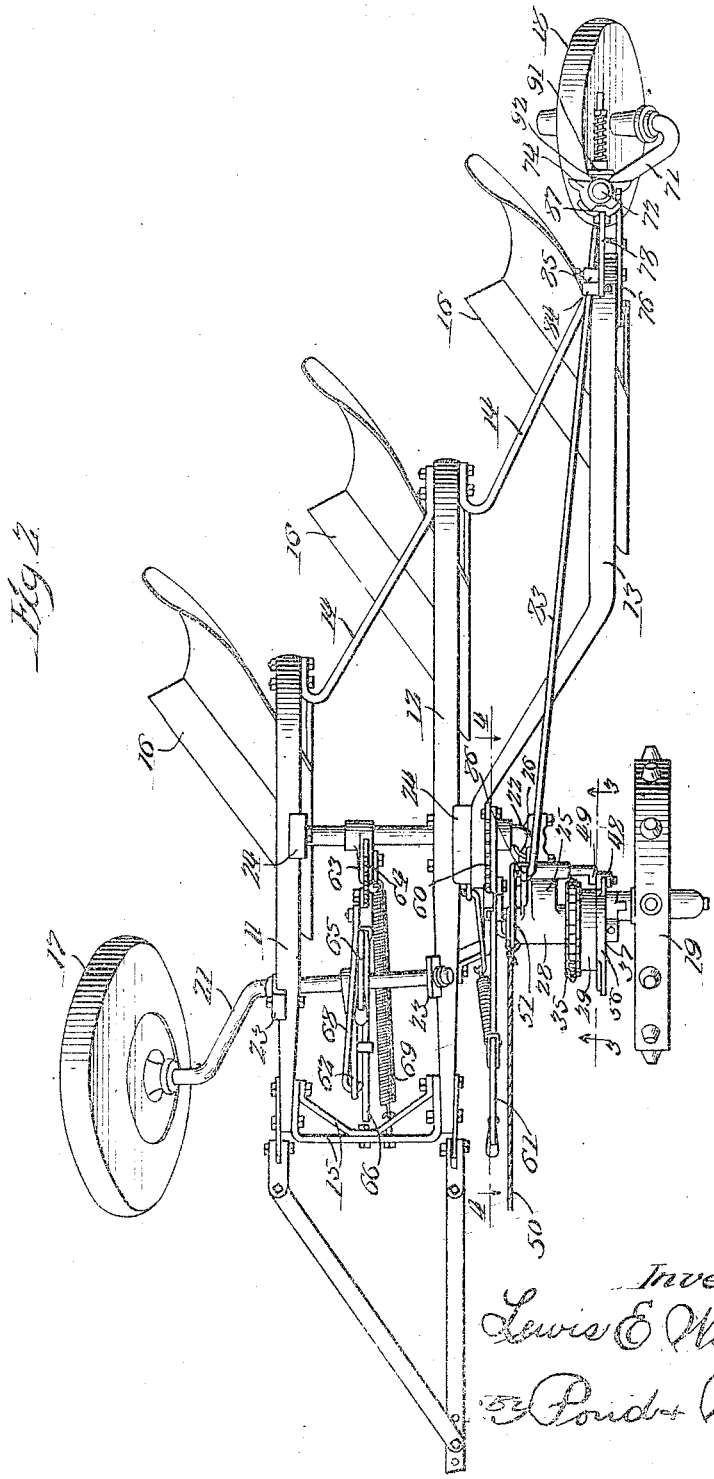

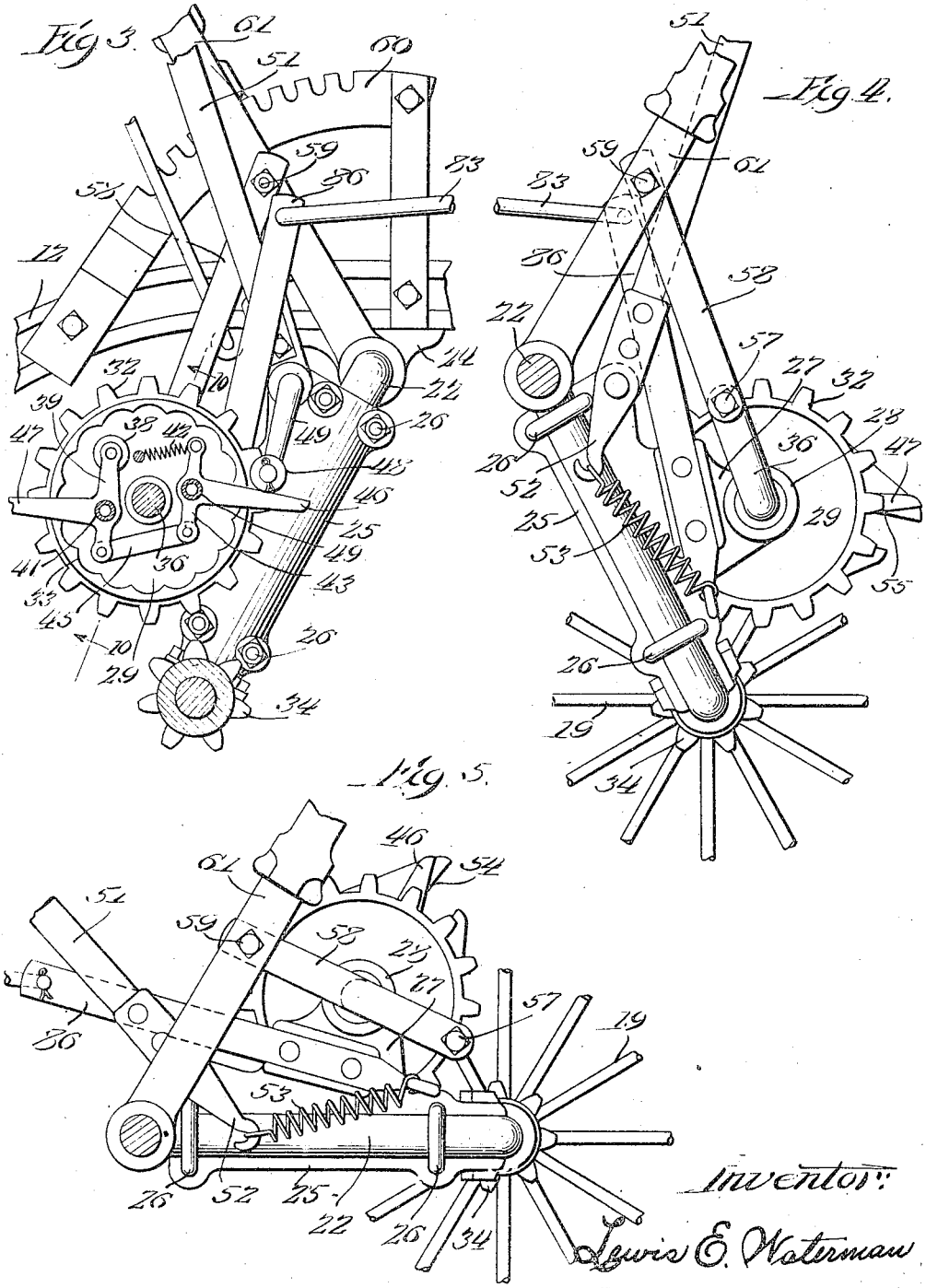

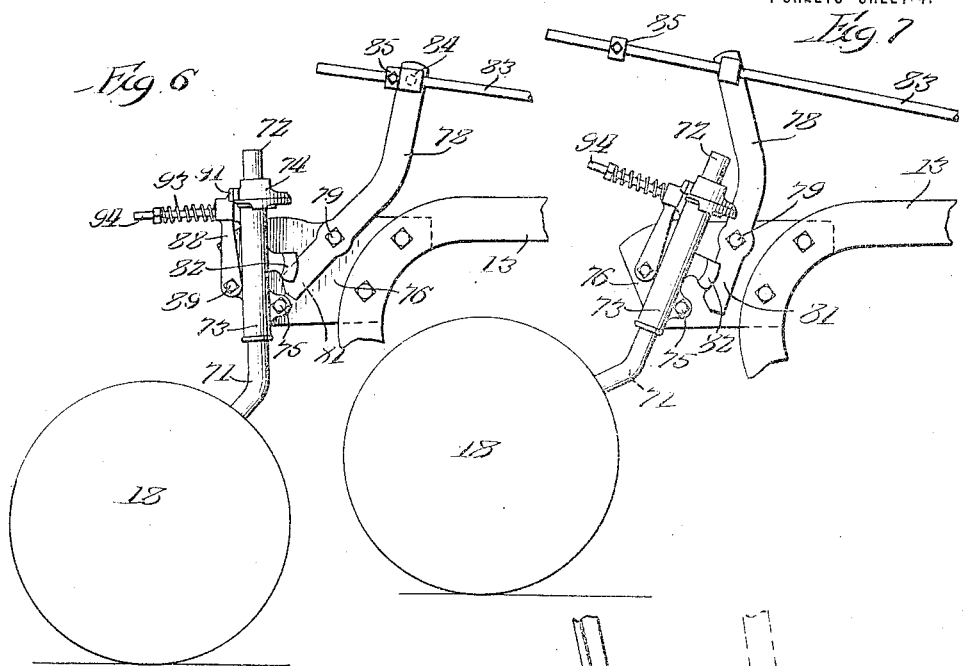
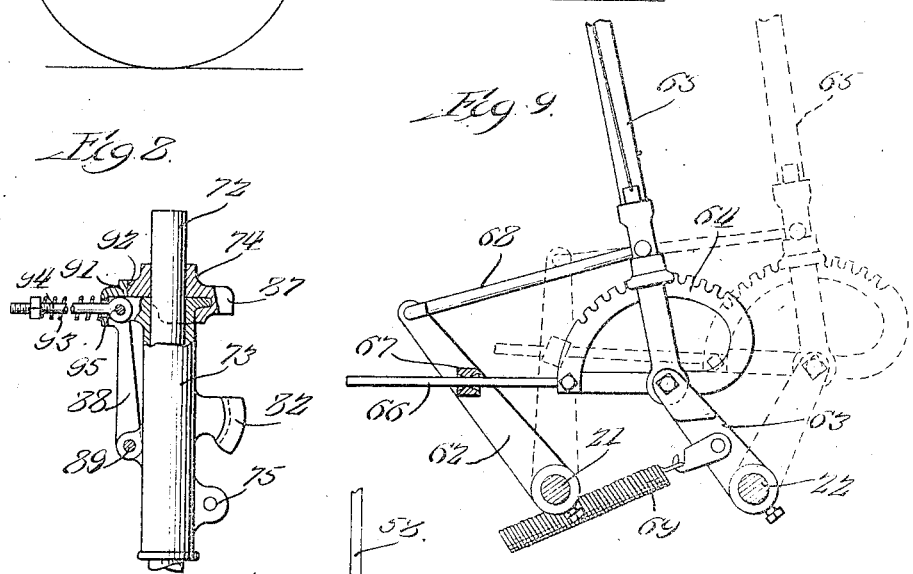

LEWIS E. WATERMAN, OF ROCKFORD, ILLINOIS, ASSIGNOR TO EMERSON-BRANTING-HAM COMPANY, OF ROCKFORD, ILLINOIS, A CORPORATION OF ILLINOIS.

POWER-LIFT PLOW.

1,288,773.

Specification of Letters Patent.   Patented Dec. 24, 1918.

Application filed December 16, 1915.   Serial No. 67,202.

*To all whom it may concern:*

Be it known that I, LEWIS E. WATERMAN, a citizen of the United States, residing at Rockford, in the county of Winnebago and State of Illinois, have invented certain new and useful Improvements in Power-Lift Plows, of which the following is a specification.

This invention relates, in general, to power lift plows, and has more particular reference to the type comprising a plurality of plow bottoms secured to a frame carried upon wheel supported crank axles so that upon swinging movement of the cranks by power-operated means the plow carrying frame may be raised and lowered to carry the plows as a unit into and out of the ground.

This general type of plow is especially adapted for use on medium sized farms in connection with small tractors to which the plows are attached so as to provide a one-man outfit i. e., a plowing outfit comprising two or three plow bottoms constructed and arranged so as to be readily manipulated and controlled by the driver from his seat on the tractor. It will be apparent that in order to employ this type of tractor for drawing a two or three bottom plow operated by one man, the plow must be light of draft and easily operated so that the operator seated on the tractor may with little effort and without interfering with his control of the tractor readily raise and lower the plow at will.

The primary object of my invention, therefore, is to provide a plow to meet the above mentioned requirements and embodying various improvements which, generally stated, consist in the provision of a simplified plow structure and an automatic raising and lowering means which will be strong and durable and adapted to be easily operated and adjusted from the tractor and which may be produced at a comparatively low cost.

In effecting this general object, my invention contemplates, in part, the provision of an improved plow-raising and lowering device operated from a power ground wheel, and comprising but few parts compactly arranged and designed to insure durability and adapted to be operated automatically at will by the operator to quickly lower the plows into the ground so that they drop almost instantly and to raise the plows more slowly by power derived from the ground wheel.

Another object is to provide a plow-carrying frame supported by front, land and furrow wheels mounted on cranks that are adapted to be swung in unison by power operated means to raise and lower the said frame, the front furrow wheel being mounted so as to be canted furroward, to insure against the wheel running out of the furrow. My invention also provides an improved means for adjusting the front furrow wheel vertically relatively to the land wheel, which will permit the plow to be attached close to the tractor, thus promoting lighter draft of the plow and bringing the adjusting means within reach of an operator seated on the tractor.

Other objects and attendant advantages will be apparent as the invention becomes better understood by reference to the following specification when considered in connection with the accompanying drawings, wherein—

Figure 1 is a side elevation of a plow embodying my improvements, showing the plow bottoms in raised position;

Fig. 2 is a plan view of my improved plow;

Fig. 3 is an enlarged vertical sectional view taken substantially on the line 3—3 of Fig. 2;

Fig. 4 is a similar sectional view taken substantially on the line 4—4 of Fig. 1;

Fig. 5 is a view similar to Fig. 4, showing the parts in the position assumed when the plow has been lowered;

Fig. 6 is a side elevation of the rear furrow wheel and its mounting, looking at the furrow side thereof;

Fig. 7 is a similar view showing the plow lowered;

Fig. 8 is a fragmentary view, partly in section, of the mounting of the rear furrow wheel spindle;

Fig. 9 is a fragmentary view of the means for adjusting and controlling the front furrow wheel; and Fig. 10 is a sectional view through the clutch of the raising and lowering device taken on the line 10—10 of Fig. 3.

Referring to Figs. 1 and 2 of the drawings, it will be observed that the plow, which is wheel supported, carries three moldboard plow bottoms. The frame of the plow, constituting the plow carrying means, consists of a plurality of plow beams 11, 12 and 13 suitably spaced and rigidly connected together at their front and rear ends. In the present instance, I have provided brace bars 14 interposed between and bolted to the rear ends of the beams so as to hold them in fixed spaced relation and have connected the front ends of the beams 11 and 12 by brace bars 15, the plow beam 13 being itself offset at its front end and bolted to the beam 12. Moldboard plows 16 are secured to the rear ends of the plow beams and any suitable or preferred form of draft means may be attached to the forward ends of the beams 11 and 12. The plow frame or plow-carrying means is supported by front and rear furrow wheels 17 and 18, respectively, and a land wheel 19 all of which are movable vertically relatively to the frame by novel means described hereinafter for the purpose of raising and lowering the frame.

The front furrow wheel 17 and the land wheel 19 are rotatably mounted on crank members 21 and 22 respectively, journaled on the frame, the crank member 21 in brackets 23 and the crank member 22 in brackets 24. It will be here noted that while the pivoted portions of the crank members 21 and 22 extend transversely of the frame in spaced relation, these portions are not disposed horizontally parallel since the crank member 21 is inclined so as to extend downwardly and furrowardly from the plow beam 12 to hold the front furrow wheel in an inclined position in a furrow so that it will tread in the corner of the furrow and be less apt to run out of the furrow during operation. It will be apparent that upon swinging the crank members 21 and 22 relatively to the plow frame the latter may be raised and lowered to move the plows into and out of the ground.

I have provided an improved means connecting the crank members 21 and 22 whereby the same will be rocked in unison, and have also provided an improved power operated device for rocking the crank members to raise and lower the plows, which will now be described. Referring particularly to Figs. 3 and 4, a bracket designated in general by reference character 25, is secured to the arm of the crank member 22. This bracket carries a clutch mechanism and several operable parts coöperating therewith. It will be noted that the bracket 25 embracing the outer side of the crank arm extends throughout substantially the entire length thereof and is clamped fixedly thereto by U-shaped bolts 26 embracing the inner side of the crank member. The bracket is thus secured to the crank arm in a very substantial manner and, in fact, serves as a means of reinforcing and strengthening the crank arm. The bracket is provided centrally intermediate its ends with a forwardly projecting portion 27 terminating in a horizontal bearing 28. In this bearing is journaled the driving member of a clutch. Referring to Figs. 3 and 10, it will be noted that the driving member 29 of cylindrical form has a hub 31 journaled in the bearing 28 and is shaped to provide a sprocket wheel 32 and an internal toothed face 33. A pinion sprocket 34 journaled on the axle of the crank member 22 in alinement with the sprocket wheel 32 and so connected with the land wheel 19 as to rotate therewith, as shown in Fig. 2, is connected by means of an endless chain 35 to said sprocket wheel 32. Thus as the plow is drawn forwardly, the clutch member 29 will be constantly rotated by the land wheel 19. A crank 36, best shown in Fig. 10, is journaled in the hub 31 of the clutch member 29 and arranged so that its crank arm is disposed at the furrow side of the bracket 25. The opposite end of the crank member 36 projects beyond the hub 31 and has fixedly secured thereto the driven member of the clutch, which, designated in general by reference character 37, covers the open side of the driving member 29. By fixedly securing the clutch member 37 to the crank member 36, the clutch members 29 and 37 and the crank 36 are held in operative relation and against axial displacement.

The driven member 37 supports in the interior of the clutch a pawl adapted to engage the notched face 33 for establishing driving connection between the members 29 and 37. Referring to Fig. 3, the pawl, in the form of a roller 38 mounted on the outer end of a lever 39 pivoted itnermediate its ends on a hollow pin 41 fixedly secured to the clutch member 37, is adapted to be moved into engagement with the notched face 33 by means of a contractile spring 42 secured at one end to the clutch member 37 and connected at its opposite end with the lever 39 through the intermediary of a lever 43 also pivoted intermediate its ends at 44 to the said clutch member and a link 45 pivotally connecting the levers 39 and 43. The levers 39 and 43 pivoted to the clutch member 37 diametrically opposite the crank shaft 36 are formed with oppositely extending integral arms 46 and 47, respectively, which extend beyond the periphery of the clutch member 29. As shown in Fig. 3, the arm 46 is engaged by a roller 48 mounted on the outer end of a crank arm 49 pivoted in the upper end of the bracket 25 and adapted to be rocked by a lever 51 secured fixedly to and extending oppositely from the said crank member 49. In Fig. 4, it will be seen that the lever 51 is provided with a downwardly projecting end 52 to which is connected a contractile spring 53 for constantly urging said lever, and consequently the crank arm 49, in a direction to hold the roller 48 in engagement with said arm 46. Viewing Fig.

1, it will be seen that the driven member 37 of the clutch is provided with diametrically oppositely disposed sockets 54 and 55 for the reception of the roller 48, the said roller in the present instance being located in the socket 54. The clutch member 37 is also shaped to provide peripheral cam faces, designated in general by reference character 56, which terminate at the sockets 54 and 55.

From the foregoing, it will be apparent that upon swinging the lever 51 forwardly, that is, in a counterclockwise direction, viewing Figs. 1 and 3, the roller 48 will be withdrawn from engagement with the arm 46, whereupon the spring 42 will move the dog 38 into engagement with the notched face 33 and engage the clutch. Assuming that the clutch member 39 is being constantly rotated in a counterclockwise direction viewing said Figs. 1 and 3, the clutch member 37 will be rotated therewith until the roller 48, which rides upon and is held yieldingly in engagement with the cam face 56, falls into the socket 55 and actuates the arm 47, thereby throwing the clutch out of engagement. Thus, the driven member 37 of the clutch, and consequently the crank arm 36, will be rotated a half revolution upon actuation of the lever 51, and automatically stopped at the completion of said half revolution; and it will be apparent that upon a second actuation of the lever 51, a similar operation will ensue. The purpose of rotating the crank member 36 by the power operated means described is to swing the crank 22 relatively to the frame to effect raising and lowering of the plows as will presently appear.

The arm of the crank 36 is pivotally connected at 57 to one end of a link 58, which in turn is pivotally connected at its opposite end 59 to a hand lever 61 loosely mounted on the crank member 22. The hand lever 61 is equipped with a spring pressed latch engaging a notched sector 60 fixedly secured to the plow frame. It will be apparent that the hand lever 61 holds the crank member 22 against swinging on its pivot, this being effected through the intermediary of the link 58 and the crank arm 36, it being assumed that the clutch is held out of engagement by the roller 48 which also holds the clutch member 37, and consequently the crank member 36, against rotation. The connection just described is in effect a pivotal connection between the lever 61 and the crank arm 22, whereby upon adjusting the lever 61, the crank arm 22 may be swung on its pivot to different set positions, such adjustment of the lever 61 being employed for changing the depth of plowing. It will now be noted that in the position the parts are shown in Fig. 3, that is, when the plows are raised, the crank member 36 and link 58 are in longitudinal alinement or in substantially a dead center relation, and that the wheel-mounted or lower end of the crank arm 22 is disposed a substantial distance forwardly of its pivoted end. Assuming the plow to be drawn forwardly, upon pulling the lever 51 forwardly by means of a cord 50 the clutch will be engaged and the crank member 36 rotated in a clockwise direction, viewing Fig. 4. Since the said crank member 36 and link 58 have been moved out of alinement, the weight of the plow frame which bears continuously on the outer end of the said crank arm 36 will swing the said crank member forwardly at a speed much greater than that of the rotating sprocket or driving clutch member 29. In other words, this force on the crank member 36 will throw the clutch out of engagement, due to the peculiar arrangement of the dog therein so that the driven member 37 of the clutch will be advanced by the weight of the plows rapidly relatively to the rotation of the driving member 29 until the crank member has turned a half revolution and assumed the position shown in Fig. 5, whereupon rotation of the crank member and the driven clutch member 37 will be automatically stopped by the roller 48 entering the notch 55 in said member. Thus the plows will be moved from a raised position to a working position in the ground very quickly by their own weight, and in fact, they actually drop, since the power operated means is employed in the lowering action merely to move the crank member 36 and link 58 out of alinement. To raise the plows from the ground, the lever 51 is pulled forwardly so as to throw the clutch into operation. It will be here noted that the force transmitted through the clutch is the converse to that when lowering the plows, since in the present instance, the pawl must work against the load of raising the plows and consequently will be held firmly in engagement with the notched face 33 of the driven member in proportion to the load to be lifted. Thus, the driven member 37 of the clutch and the crank member 36 will be rotated with the driving clutch member 29 a half revolution which completes the raising operation, at the end of which the clutch is automatically thrown out and the parts assume the position shown in Fig. 3.

While in describing the operation of the power operated means for raising and lowering the plows I have thus far considered in detail only the rocking of the crank member 22 for raising and lowering the plow frame, it should be understood that the furrow wheel crank 21 is rocked by and in unison with the crank 22 so that both sides of the plow frame will be equally raised and lowered. The means connecting the crank members 21 and 22 whereby they are rocked in unison and whereby they may be relatively rocked to level the plows and adjust the same as to depth will now be described.

Referring to Figs. 2 and 9, rocker arms 62 and 63 are respectively fixedly secured to the crank members 21 and 22 and extend upwardly and forwardly therefrom in parallel relation, the arm 62 being considerably longer than the arm 63. The rocker arm 63 has pivotally mounted on its outer end a notched sector 64 and a hand lever 65 equipped with a spring latch coöperating with the sector, which is held against rotation on its pivotal mounting by means of a rod 66 formed integral with the sector and passing through the eye of a keeper or guide 67 secured to the rocker arm 62. In Fig. 9, it will be noted that the guide 67 is positioned on the rocker arm a distance from the pivot axis of said arm substantially equal to the distance between the centers of the pivot axis of the rocker arm 63 and the lever pivot at its outer end, thus forming substantially a parallelogram pivoted at its corners. Since the rod 66 is but slidingly connected with the rocker arm 62, positive connection is established between the rocker arms 62 and 63 through the medium of a link 68 pivotally connecting the outer end of the rocker arm 62 and the lever 65. Since the rocker arm 62 swings on an axis non-parallel with the pivot axis of the rocker arm 63, the link 68 is provided with a hooked end passed through an eye in the rocker arm 62 and the aperture through the guide 67 is enlarged at both ends to allow proper flexibility between these parts during the lateral swinging movement of the said rocker arm 62. By this connection, it will be apparent that when the crank member 22 is rocked the crank member 21 will be likewise rocked through the intermediary of members 63, 65, 68 and 62. Thus a positive connection between the crank members 21 and 22 is established so that the furrow wheel 17 and the land wheel 19 will be moved vertically relatively to the plow frame in unison. A contractile spring 69 connecting the rocker arm 63 and a brace bar 15 exerts a force tending to raise the plow frame. The purpose of the hand lever 65 and sector 64 in the connection between the crank members 21 and 22 is to provide means whereby the furrow wheel 17 may be adjusted vertically relatively to the land wheel 19, so that the plows may be leveled in a direction transverse to the line of draft. Such an adjustment may be made by swinging the hand lever 65 to different positions on the sector 64, and consequently swinging the crank member 21 to either raise or lower the front furrow wheel 17, it being apparent that during such adjustment the sector 64 is held against rotation on its pivot by the rod 66. The peculiar connection between the crank members 21 and 22, which includes the adjustable hand lever 65, while providing a simple and practical connection between these crank members so that they will rock in unison and be capable of relative adjustment, also affords several advantages of considerable importance. It will be remembered that when the plow is automatically raised and lowered by the power operated means, the crank members 21 and 22 are rocked, and consequently the hand lever for adjusting the front furrow wheel 17 is swung backwardly and forwardly with each raising and lowering operation. In the event that this adjusting lever were fixedly secured directly to either of the crank members 21 or 22, it will be apparent that it would swing during the raising and lowering operation through a considerable arc and be a source of danger to any person within its range of movement and that this danger is accentuated by reason of the rapidity of movement of the several parts when the plow is lowered. In my improved construction, however, the hand lever 65 is not swung through an arc at each raising and lowering operation of the plow, but is moved backwardly and forwardly a comparatively short distance and in a substantially parallel movement, as is clearly illustrated in the several positions indicated in Fig. 9. This permits hitching the plow comparatively close to the tractor thereby minimizing the draft of the plow and brings the adjusting levers of the plow into closer relation to the operator so that he may easily make adjustments from his seat on the tractor without danger of being injured by a lever such as mentioned above.

When the plow frame is raised and lowered by the power-operated means, it will be apparent, because of the position of these means forwardly on the plow frame, that the front end of the frame is raised and lowered upon the rear furrow wheel 18 as a fulcrum. Since such operation does not raise the rearmost plow equally with respect to the foremost plow, I have provided means for raising and lowering the said rear end automatically and simultaneously with similar movement of its forward end. To effect this, I have provided an improved means operated from the power-operated raising and lowering means for moving the rear furrow wheel vertically relatively to the plow frame, which means will now be described. Referring particularly to Figs. 6, 7 and 8, a spindle 71 upon which the rear furrow wheel 18 is mounted on an axis inclined downwardly and forwardly is provided with an upright portion 72 rotatably mounted in a sleeve bracket 73 and held against axial displacement relatively thereto by means of a collar 74 secured by a set screw to the upper end of the spindle and formed to fit over an annular flange on the upper end of the sleeve bracket 73 as clearly shown in Fig. 8, so that the spindle and collar may move rotatably with respect to the bracket 73. This bracket is pivotally mounted adjacent to its lower end at 75 upon a plate 76 bolted to and extending rearwardly from the rear end of the plow beam 13 and is provided adjacent to its upper end with an integral laterally projecting guide 77 (Fig. 1) over-reaching and slidingly engaging the plate 76 so as to hold the bracket 73 against lateral displacement. The upper rear edge of the plate 76 is shaped in the form of an arc struck from the center of the pivot bolt 75 so that the guide 77 will coöperatively engage the plate 76 as the bracket 73 is swung on its pivot. A lever 78 pivoted intermediate its ends at 79 to the plate 76, is arranged so that its lower end 81 is disposed intermediate the arms of a forked abutment 82 integral with the bracket 73 and engages the said abutment to hold the bracket 73 and the spindle 72 in substantially upright position as shown in Fig. 6. The lever 78 is held in the position shown in Fig. 6 by means of a rod 83 passing at its rear end through an eyelet 84 swiveled to the outer end of the lever 78 against which a collar 85 secured by a set screw to the rod 83 is adapted to abut and is pivotally connected at its forward end to an arm 86 fixedly secured to the forward extension 27 of the bracket 25, as shown in Fig. 4. It will be noted that the lower end of the arm 86 is shaped to provide a hook to which one end of the spring 53 mentioned above in the description of the power operated lift is connected, so as to provide a fixed point of attachment for one end of said spring. As shown in Figs. 1 and 6, both the front and rear end of the plow frame is elevated, the crank-wheel supporting means for the front end being held in locked position relatively to the frame by means of the power-operated lifting mechanism described above and the rear furrow wheel spindle being held in upright position through the intermediary of the lever 78, rod 83 and arm 86, which latter is connected fixedly with the crank member 22, and, therefore, locked against movement. It will be manifest that when the power-operated means is actuated to lower the plows, the arm 86 will be swung rearwardly by the raising action of the crank arm 22, thus moving the rod 83 rearwardly and withdrawing its collar 85 from connection with the lever 78 so that the same may be swung in a counter-clockwise direction on its pivot, viewing Fig. 7. Since the weight of the rear end of the plow frame is carried through the spindle 71 and the furrow wheel 18 thereof is mounted considerably to the rear of the pivot 75, when the lower end of the lever 78 is swung forwardly, the spindle 73 will swing forwardly on the pivot 75 by the action of the weight of the plow frame, the abutment 82 of the bracket 73 following the lower arm of the lever 78. This movement of the sleeve 73 is limited by the collar 74 abutting against the lever 78, the said collar being shaped to provide a recess 87 for the reception of the lever 78. Since the walls of the recess 87 engage both sides of the lever 78 and the collar 74 is fixedly secured to the spindle 72, it will be apparent that, when the spindle is swung forwardly to the position shown in Fig. 7, the spindle will be locked against rotation. Thus, when the plow frame is lowered, the means employed for lowering the rear end thereof also function in positively locking the rear furrow wheel against castering, so that when the plow is in operation the rear furrow wheel will be held rigidly in the proper angle in the furrow and will effectively carry the side thrust from the plows. When the plows have been raised it is desirable that the rear furrow wheel be permitted to caster, although not too freely, since when moving the plow backwardly the rear furrow wheel might caster and swing the plow to one side. To provide against an entirely free castering of the rear furrow wheel, a spring pressure is applied to the spindle 72 so that it may rotate only against this yielding pressure. The means for effecting this consists of the arm 88 pivoted at 89 to the rear side of the sleeve bracket 73 and provided at its outer end with a flat face 91 held into engagement with a correspondingly flat face 92 formed on the collar 74, by means of an expansion spring 93, the ends of which are confined between the outer end of said arm 88 and a nut screwed on a bolt 94, which is connected to the sleeve bracket 73 at 95. It will be apparent that by this construction, the rear furrow wheel is normally held in proper alinement and is permitted to caster laterally against the yielding pressure of the spring 93.

The construction last described relative to the rear furrow wheel is made the subject matter of and is claimed in a separate application Ser. No. 94419, filed April 29, 1916, and the means connecting the front furrow wheel and the land wheel whereby they are moved in unison and may be relatively adjusted is made the subject matter of and is claimed in application Ser. No. 99452, filed May 23, 1916.

I claim:

1. The combination of a frame, a crank member pivoted thereon, a supporting wheel mounted on the crank member, a clutch mounted on the crank member intermediate its pivot axis and that of the supporting wheel, a driving connection between the wheel and one of the clutch members, a crank member connecting the other clutch member and the frame, and means for throwing the clutch into and out of engagement whereby upon the clutch being engaged the second named crank member will be turned so as to swing the first named crank member on its pivot and raise the frame.

2. The combination of a frame, a crank member pivoted thereon, a supporting wheel mounted on the crank member, a bracket secured to the arm of the crank member, a clutch mounted on said bracket on an axis disposed intermediate the pivot axis of the crank member and its carrying wheel, a driving connection between one of the clutch members and the supporting wheel, and a connection between the other clutch member and the frame whereby upon engaging the clutch members the crank member will be rocked to raise the frame.

3. The combination of a frame, a crank member pivoted thereon, a supporting wheel mounted on the crank member, a clutch mounted on the crank member intermediate its pivot axis and the wheel axis, a driving connection between the said supporting wheel and the driving member of the clutch, a second crank member connected with the driven member of the clutch, an adjustable hand lever mounted on a pivot fixed with respect to the frame, a link connecting the hand lever and the second crank member, and means for engaging the clutch whereby to swing the first crank member on its pivot to effect raising and lowering of the frame and for automatically disengaging the clutch at each half revolution of the second crank member, the second crank member and the said link being so arranged as to be disposed substantially in longitudinal alinement when the clutch is out of engagement.

4. In a plow, the combination of a plow beam, a crank pivoted thereto, a ground wheel pivoted on said crank so as to be movable vertically with respect to the beam, an adjusting lever, lifting mechanism including a revoluble part mounted on said crank intermediate its pivot axis and the wheel axis and having a crank member fixed thereto and having another revoluble part in driving connection with the ground wheel, means for conecting said parts together at will to effect rotation of the said crank member, and a link connection between said crank member and lever arranged so that when the crank member is rotated through a complete cycle the ground wheel will be raised and lowered relatively to the plow beam, and whereby the said ground wheel may be adjusted vertically with respect to the plow beam by means of said lever through the intermediary of said link and crank member.

5. In a plow, the combination of a plow beam, a crank member and an adjusting lever co-axially pivotally mounted on the plow beam, the crank member being equipped at its free end with a ground wheel and the lever being adjustably connected with a part fixed to the plow beam, a clutch mounted on the crank member intermediate its pivot axis and the wheel axis and having its driven element connected to said lever and its driving element operated by rotation of the ground wheel for swinging the crank member to raise and lower the ground wheel with respect to the plow beam, the said lever being adjustable to vary such movement of the ground wheel with respect to the plow beam.

6. In a plow, the combination of a plow beam, a crank member and an adjusting lever co-axially pivotally mounted on the plow beam, the crank member being equipped at its free end with a ground wheel and the lever being adjustably connected with a part fixed to the plow beam, a clutch device mounted on the crank member intermediate its pivot and the wheel axis, connections between the clutch device and the said lever and the ground wheel whereby the crank member may be rocked to raise and lower the ground wheel with respect to the plow beam by engaging the clutch device, and whereby the range of such movement relatively to the plow beam may be adjusted by means of said lever.

7. In a plow, the combination of a plow beam, a crank member mounted thereon and equipped at its free end with a ground wheel, a clutch device mounted on the crank member intermediate its pivot and wheel axis and having one of its clutch elements in driving connection with the ground wheel, a crank member fixed to the other clutch element, a member attached to the plow beam, a link connecting the free end of this crank member to said member, whereby when the clutch is engaged the wheel-carrying crank member will be rocked by the clutch-connected crank member, and means for engaging and disengaging the clutch elements and for holding the crank-connected clutch element locked at diametrically opposite points at which the arm of its crank member is in substantial alinement with the said link.

LEWIS E. WATERMAN.